Aug. 18, 1942.   W. M. STOCKER   2,293,178
ART OF SEVERING THERMOPLASTIC WEBS
Filed Jan. 9, 1942   2 Sheets-Sheet 1
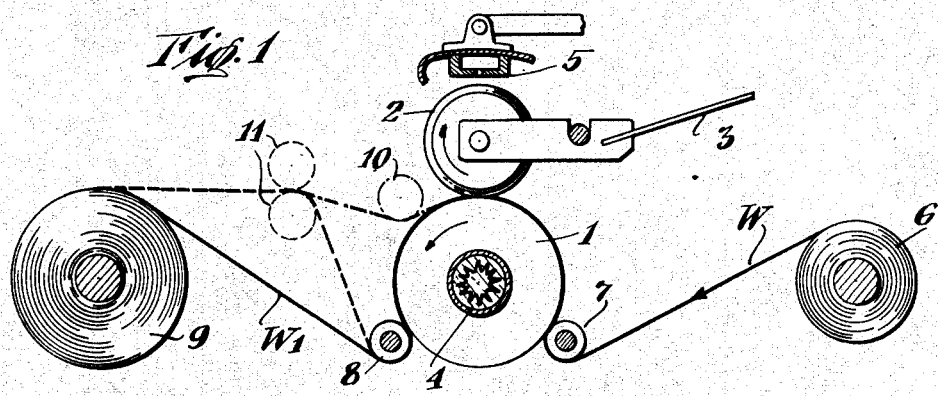
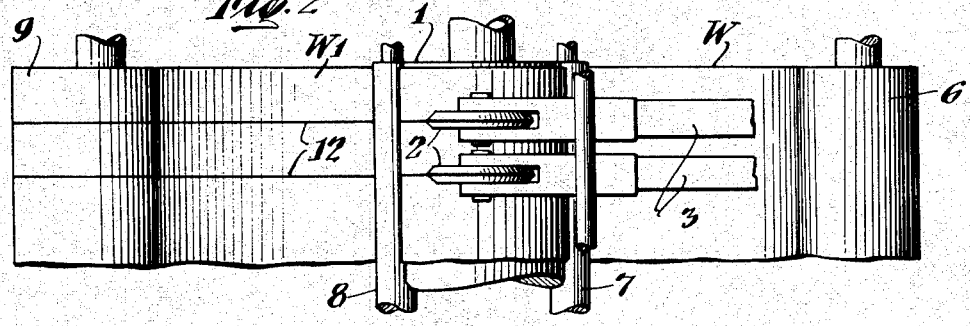
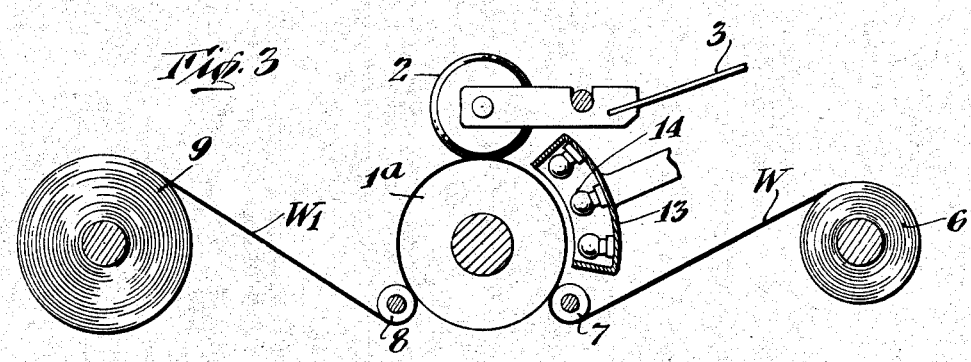
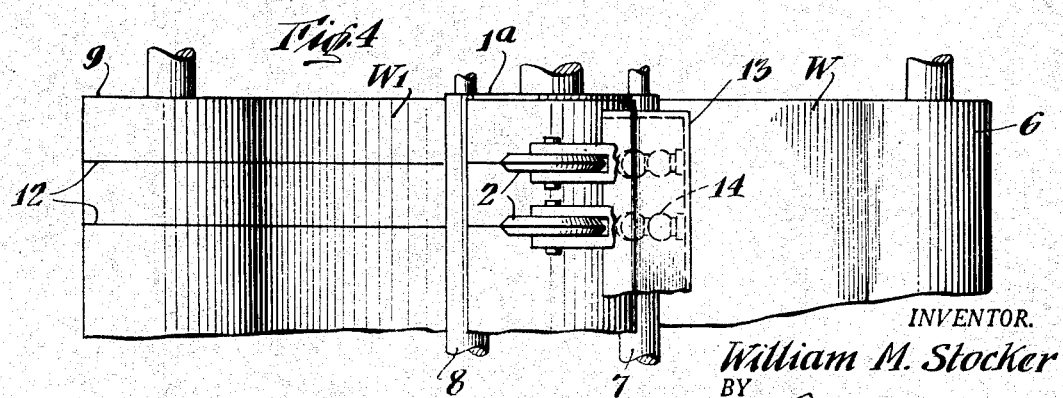
INVENTOR.
William M. Stocker
BY
ATTORNEY Aug. 18, 1942.  W. M. STOCKER  2,293,178
ART OF SEVERING THERMOPLASTIC WEBS
Filed Jan. 9, 1942   2 Sheets-Sheet 2
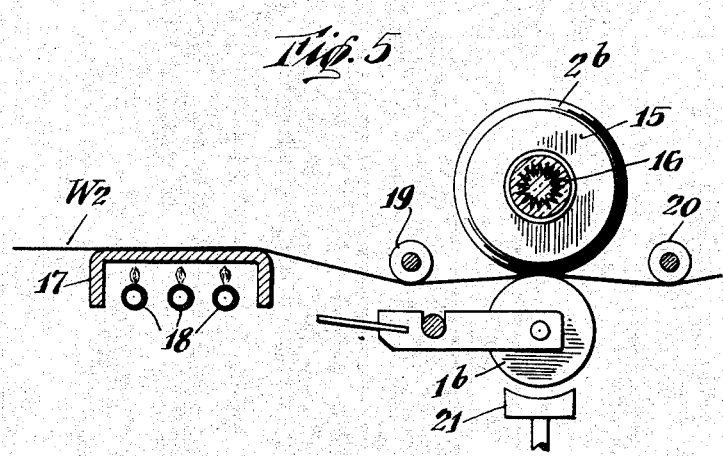
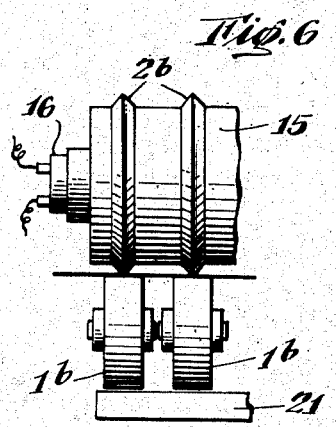
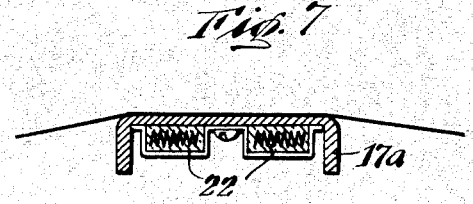
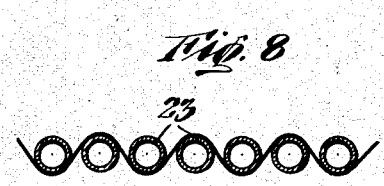
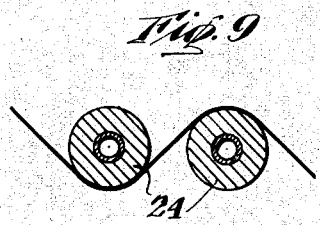
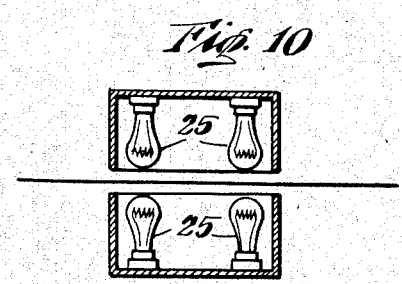
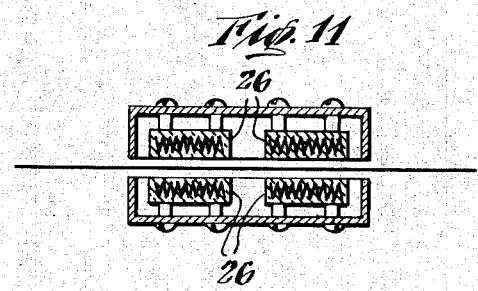
INVENTOR.
*William M. Stocker*
BY
*[signature]*
ATTORNEY Patented Aug. 18, 1942

2,293,178

UNITED STATES PATENT OFFICE 2,293,178

ART OF SEVERING THERMOPLASTIC WEBS

William M. Stocker, Hollis, N. Y., assignor to Cameron Machine Company, Brooklyn, N. Y., a corporation of New York Application January 9, 1942, Serial No. 426,145

4 Claims. (Cl. 164—17)

The present invention relates to the art of severing a running flexible web, consisting at least in part of thermoplastic material, into longitudinal sections and sealing the severed edge thereof.

In the prior art, as heretofore practiced, it has been the custom to subject the web material to the action of a severing member heated to a temperature above the scorching point of the material of the web. It will be understood that the scorching point will vary with the particular material acted upon and that the temperature that can be employed will also depend upon the speed at which the web is running during the severing action and that, conversely, the speed at which the web must be moved will depend upon the temperature employed. That is: the greater the temperature, the greater the speed required, and the greater the speed, the greater the temperature required. As high speed is very desirable, in order to get the greatest production possible in a given period of time, the tendency has been to increase the temperature until a point has been reached where it is difficult to maintain the requisite degree of heat commensurate with the speed of the web, where the heat is so great as to adversely affect the severing member, and where a slight temporary lowering of the web speed, owing to improper operation of the machine or otherwise, may have a disastrous effect upon the material being acted upon. The main object and feature of this invention is to enable the severing operation to be carried on at high speeds without the necessity of heating the severing member excessively above the scorching point of the material of the web.

In the prior art, as heretofore practiced, it has been the custom to associate a supporting member, over which the running web passes, with the heated severing member and this supporting member has either been unheated or has been positively cooled as by means of a circulating fluid, the theory being that the web should be chilled especially after severance has taken place, so as to set the severed edges, of the sections, that have been plasticized by the heated severing member during the severing action. Examples of this practice are found in my application Ser. No. 410,481 filed September 11, 1941, on which practice the present invention is an improvement.

I have found that, by heating the web above room temperature but below the scorching point of the material of the web and subjecting the thus heated web to the action of a severing member that is heated to a temperature above the scorching point of the material of said web, excessive heating of said severing member can be avoided. Preferably the web should be heated to a temperature only slightly below the scorching point of the material of the web and the severing member should be heated to a temperature as close above said scorching point as is consistent with the speed of the running web.

In the accompanying drawings the process of the invention is disclosed in connection with several forms of apparatus in which:

Fig. 1 is a diagrammatic side view of one form of apparatus by means of which the process of the instant invention can be carried out;

Fig. 2 is a top plan view of part of Fig. 1, the heating means for the severing members being omitted;

Figs. 3 and 4 are views similar to Figs. 1 and 2 but showing a slightly modified form of the invention;

Figs. 5 and 6 are views similar to Figs. 1 and 2, but showing an arrangement of the severing means the reverse of that previously illustrated; and Figs. 7 to 11 are diagrammatic views showing modified means for preheating the web.

Referring first to Figs. 1 and 2, 1 indicates a rotatable, smooth-face circular member, here in the form of a single roll extending across the entire width of the machine, constituting the supporting means over which the web passes, and forming here a part of the severing means for the web. 2 denotes one or more rotatable, circular severing members in knife-edge engagement with said smooth-face member. Each member 2 is individually spring-pressed, in a well understood manner, as indicated by springs 3. Member 1 is heated by any suitable means, here diagrammatically indicated by resistance element 4 located in the interior of said member to thereby bring the outer surface thereof up to a temperature above room temperature and preferably close to but below the scorching temperature of the web material being acted upon. Members 2 are heated by any suitable means up to a temperature above the scorching point of the web material, and preferably as close to said scorching point as is consistent with the speed of the web. In the present instance, an open gas burner 5 projecting a naked flame against severing members 2 is utilized, which feature is not claimed herein, but is claimed in my said application Ser. No. 410,481.

Web W, which may consist wholly or at least partly of thermoplastic material such as acetate, is unwound from supply roll 6 and is trained around guide roller 7 and thence over the surface of member 1 so as to preheat said web before it reaches the severing point, i. e.: the point of contact between members 1 and 2. The web sections W1 thus produced can then be disposed of in any suitable way, as by passing them to guide roller 8 and thence to winding mechanism 9 which advances the web and its sections at substantially the same speed as the surface speed of members 1 and 2. Or, the web sections W1 can pass from the point of severance under guide roller 10 and thence to winding mechanism 9. If desired, positively driven feed rollers 11, having a surface speed substantially equal to the surface speed of members 1 and 2, can be interposed between guide rollers 8 or 10 and winding mechanism 9. It will be understood that severing members 2 produce plastic zones in the web material and at the same time produce lines of severance 12 in the web, thereby producing the longitudinal web sections W1, the severed edges of which are sealed against raveling, but this broad concept, as well as the mechanical means for carrying it out, are not claimed herein but form the subject matter of my said application Ser. No. 410,481.

Figs. 3 and 4 show a slightly modified form of the invention disclosed in Figs. 1 and 2, this modification consisting of heating the web by heating means that are located externally of smooth-face member 1a instead of internally as at 4 in Fig. 1. As shown in Figs. 3 and 4, 13 is a heating member preferably of curved formation to correspond with the surface of member 1a, the heating means being here, for example, a source of radiant heat such as lamps 14.

In Figs. 5 and 6 is shown an arrangement the reverse of that disclosed in Figs. 1 to 4 inclusive. As there indicated, severing members 2b are mounted on a common rotatable carrier 15, the interior of which can be heated by any suitable means such as resistance element 16 to thereby heat said members 2b above the scorching point of the material of the web. 1b indicates a plurality of individually spring-pressed smooth-face rollers, one for each member 2b. In this instance, web W2 coming from a supply roll passes over the surface of a heating plate 17 which in this case is heated by means of gas burners 18. From thence the web passes beneath guide roller 19 and between members 1b and 2b and thereafter the web sections pass beneath guide roller 20 and to the winding apparatus. The web, in passing over surface 17, is heated up to a temperature below the scorching point of the web material and, if desired, members 1b can also be heated by means of a heater 21 to prevent undue lowering of the temperature of said web.

It will be understood that the particular means used to preheat the web can be varied widely. For instance, as shown in Fig. 7, heating plate 17a, over which the web passes before being severed, can be heated by electrical heating elements 22. Or, as shown in Fig. 8, the web can be trained around steam pipes 23, or, as in Fig. 9, the web may pass around rotatable cylinders 24 that can be heated by gas or steam or by electrical means. It is desirable to pass the web in contact with a heated surface during the preheating action because the web is thereby not only brought up to the requisite temperature below the scorching point of the material, but said material of the web is also smoothed or ironed out which is of great advantage during the subsequent severing action. It is, however, not an absolute necessity that the web be preheated by actual contact with a heated surface. As shown in Fig. 10, the web, in passing to members 1, etc., can travel between, but out of contact with, sources of radiant heat 25 or, as shown in Fig. 11, said web can travel between, but out of contact with, electric grids 26.

I claim:

1. A method of severing a running flexible web, composed at least in part of thermoplastic material, into longitudinal sections and sealing the severed edges thereof, which consists in: heating the web above room temperature but below the scorching point of the material of said web, and subjecting the thus heated web to the action of a severing member that is heated to a temperature above the scorching point of said material.

2. A method of severing a running flexible web, composed at least in part of thermoplastic material, into longitudinal sections and sealing the severed edges thereof, which consists in: subjecting the web to the action of two members, one, a rotatable, smooth-face circular member heated to a temperature above room temperature but below the scorching point of the material of said web and, another, a rotatable, circular severing member heated to a temperature above the scorching point of the material of said web, and causing said web to pass over the surface of the smooth-face member before it is acted upon by said two members.

3. In a method of severing a running flexible web, composed at least in part of thermoplastic material, into longitudinal sections and sealing the severed edges thereof, and in which the web is subjected to the simultaneous action of two members, one, a rotatable, smooth-face circular member and, the other, a rotatable, circular severing member, the latter heated to a temperature above the scorching point of said material: the steps of heating the web, while on the run and before severance, above room temperature but below the scorching point of said material, to thereby avoid heating the severing member excessively above the scorching point of the material of said web, and subjecting said web while so heated to the action of said two members.

4. In a method of severing a running flexible web, composed at least in part of thermoplastic material, into longitudinal sections and sealing the severed edges thereof, and in which the web is subjected to the simultaneous action of two members, one, a rotatable, smooth-face circular member and, the other, a rotatable, circular severing member, the latter heated to a temperature above the scorching point of said material: the steps of heating the smooth-face member above room temperature but below the scorching point of said material, to thereby avoid heating the severing member excessively above the scorching point of the material of said web, and causing said web to pass over the surface of the smooth-face member before it is acted upon by said two members.

WILLIAM M. STOCKER.